(12) United States Patent
Pedrazzini et al.

(10) Patent No.: US 7,844,747 B2
(45) Date of Patent: Nov. 30, 2010

(54) PERFORMANCE TUNING USING ENCODED PERFORMANCE PARAMETER INFORMATION

(75) Inventors: Giorgio Pedrazzini, Rancho S. Margarita, CA (US); Sandro Cerato, Superior, CO (US); Alberto Salina, Limbiate (IT)

(73) Assignees: STMicroelectronics, Inc., Carrollton, TX (US); STMicroelectronics S.r.l., Agrate (Brianza) (IT)

( * ) Notice: Subject to any disclaimer, the term of this patent is extended or adjusted under 35 U.S.C. 154(b) by 453 days.

(21) Appl. No.: 10/164,079

(22) Filed: Jun. 5, 2002

(65) Prior Publication Data

US 2003/0229730 A1   Dec. 11, 2003

(51) Int. Cl.
*G06F 13/10* (2006.01)

(52) U.S. Cl. ............................. 710/8; 710/62

(58) Field of Classification Search ............ 710/2, 710/8, 10, 33, 62, 72, 104, 16, 36; 705/66; 257/499; 711/170; 375/219; 714/732, 724, 714/733
See application file for complete search history.

(56) References Cited

U.S. PATENT DOCUMENTS

| | | | | |
|---|---|---|---|---|
| 4,150,331 A * | 4/1979 | Lacher | ............ | 324/133 |
| 4,769,883 A * | 9/1988 | Nathanson et al. | ......... | 29/25.42 |
| 4,906,956 A * | 3/1990 | Kakihana | .................. | 333/246 |
| 5,122,970 A * | 6/1992 | Gilbert et al. | ................ | 702/33 |
| 5,649,018 A * | 7/1997 | Gifford et al. | ........... | 381/71.14 |
| 5,764,655 A | 6/1998 | Kirihata et al. | | |
| 5,873,063 A * | 2/1999 | Wu et al. | .................... | 704/258 |
| 6,067,598 A * | 5/2000 | Roohparvar et al. | ........ | 711/103 |
| 6,185,712 B1 | 2/2001 | Kirihata et al. | | |
| 6,229,378 B1 * | 5/2001 | Gourley et al. | ............. | 327/525 |
| 6,441,742 B1 * | 8/2002 | Lovely et al. | ............ | 340/573.1 |
| 6,556,345 B1 * | 4/2003 | Gassner et al. | ........... | 359/341.4 |
| 6,574,679 B1 * | 6/2003 | Chliwnyj et al. | ............. | 710/10 |
| 6,583,642 B2 * | 6/2003 | Huang et al. | ................. | 324/765 |
| 6,590,441 B2 * | 7/2003 | Papathanasiou | ............. | 327/530 |
| 6,630,860 B1 * | 10/2003 | Anumula et al. | ............ | 327/553 |
| 6,671,765 B1 * | 12/2003 | Karlsson et al. | ............. | 710/310 |
| 2002/0072872 A1 * | 6/2002 | Chatterjee et al. | ........... | 702/117 |
| 2002/0095278 A1 * | 7/2002 | Riley et al. | .................... | 703/2 |
| 2002/0151292 A1 * | 10/2002 | Sevens et al. | ............... | 455/313 |
| 2003/0066037 A1 * | 4/2003 | Patra et al. | .................... | 716/2 |

FOREIGN PATENT DOCUMENTS

| | | | |
|---|---|---|---|
| EP | 752677 A2 * | 1/1997 | |
| EP | 0 831 401 A1 | 3/1998 | |
| JP | 60072067 A * | 4/1985 | |
| WO | WO 9964996 A1 * | 12/1999 | |

OTHER PUBLICATIONS

Frank Goodenough, "Analog MOS Driver IC Simplifies Motor-Phase Control," Electronic Design, Jun. 23, 1997, pp. 42, 44, 46.
Richard J. Valentine, "Power Module Control Design," Oct. 8, 1995, pp. 904-910.
European Search Report, EP 03 25 3398 (Oct. 30, 2003).

* cited by examiner

*Primary Examiner*—Ilwoo Park
(74) *Attorney, Agent, or Firm*—Lisa K. Jorgenson; William J. Kubida

(57) ABSTRACT

A multi-chip system in which at least one of the chips includes a performance parameter encoded thereon. After system assembly, the performance parameter can be obtained by a companion chip and used to automatically or semi-automatically fine tune the companion chip to the specific parameters of the at least one chip.

1 Claim, 3 Drawing Sheets

PERFORMANCE TUNING USING ENCODED PERFORMANCE PARAMETER INFORMATION

BACKGROUND OF THE INVENTION

1. Field of the Invention

The present invention relates, in general, to integrated circuit (IC) systems, and, more particularly, to a self-configuring multiple IC system having a device performance signature stored in at least one chip.

2. Relevant Background

Great advances in various fields of electronics have been achieved by increasing the level of integration of components to form systems on integrated circuit (IC) chips. Increasingly, IC chips are optimized to perform a specific application while also trying to minimize the number of external components and the cost of the IC.

While it is generally desirable to integrate as much if not all system functionality on a single IC, this is often impractical. Particularly where the functions performed by various parts of the system are quite different, and require disparate or incompatible IC fabrication technologies. Quite frequently, for example, a system requires a certain degree of logic, intelligence or programmability while at the same time requiring specialized devices to monitor, sense, or drive external devices. Quite often systems have comprised an interaction between analog/linear subsystems used to acquire and/or generate analog signals and digital subsystems that are more suited for processing and storing binary data. The overall tradeoffs between system performance and cost can be improved by implementing the system using two or more separate ICs.

One example of such a system is a power current driver used to drive power or high current devices. Such systems include power switches that are designed to handle relatively high current loads required to drive motor coils, switching regulator coils, read/write heads in disk drives, and the like. In such systems the technology used to manufacture the power switching devices such as power bipolar and double diffused metal oxide semiconductor (DMOS), is difficult to integrate with the processes used to manufacture control logic devices, such as complementary MOS (CMOS) technology. Moreover, power switching devices are typically designed to operate at high temperatures where conventional CMOS devices may perform poorly. Although a variety of attempts have been made to integrate power switching and logic devices, these integrations still remain an expensive solution.

As a result, typical systems are formed using two or more chips such that one device implements the power switching functions and another chip implements the control logic that drives the power switch. The control logic is typically implemented as an application specific integrated circuit (IC) having programmable logic, memory, and data or signal processing capability integrated on chip. In this manner, each chip can be manufactured using processes that improve their respective performance without compromising performance of the other chips in the system. Further, a single control chip design can service a wide range of applications with programming changes, and upgrades to either chip can be made independent of the other chip. These advantages greatly favor multi-chip designs.

In contrast to the driver example above, there are many applications that involve a linear chip that provides input to a logic device. The field of sensors, such as optical, chemical, pressure, acceleration, electromagnetic fields and the like are one example of multi-chip systems. Sensing devices themselves often require very specialized manufacturing techniques and packaging that are incompatible with logic and digital signal processing systems used to drive and monitor the sensors. Similarly, radio frequency and microwave frequency devices that are used in transmitters, receivers, and amplifiers often are implemented in separate chips from the logic devices that are used to process the received and transmitted information.

Analog or linear devices are typically specified to operate within relatively wide ranges of performance parameters. For example, a power transistor is characterized by several critical parameters such as on resistance, input capacitance, temperature sensitivity, rise/fall time and the like. Sensors may specify output linearity and temperature sensitivity. Transmitter and receiver circuits may provide a particular output and/or input impedance that affect their performance. Each device is tested to fall within a specified range of parameters for each characteristic. As a general rule, the wider the range of parameters that can be accepted, the lower the cost of the devices. Conversely, devices with very narrow parameter ranges tend to be exceptionally expensive.

As a result, system designers often detune a particular design to allow wide parametric ranges that will be encountered in mass production. Moreover, because designers do not have actual knowledge of the parameters for a particular system implementation, designers typically add guardbands around the specified parameters to ensure operation under all expected conditions.

As an example, in a motor control circuit the timing of the drive signal applied to the power switch is dependent upon the input capacitance, switching speed, and on resistance of the power switch. A large input capacitance requires more drive current supplied by a control chip as compared to a switching device with a lower input capacitance. Because the system is designed to perform with a wide range of input capacitance, however, the control circuit may be configured to supply a single large current that will ensure the worst-case power switch is driven to switch in an acceptable time. However, the system designer could specify much better performance, with no changes in components, if only the designer knew precisely what input capacitance was to be driven.

In the motor control example this compromise will affect how tightly the motor's response can be specified. If the motor control circuit is used in a disk drive, for example, the result might be significantly lower storage capacity or significantly higher access time for a given set of components than is actually possible. Conversely, a disk drive of a given performance could be manufactured using less expensive motor control parts if only it were possible to efficiently performance tune the multi-chip systems.

Fine-tuning multi-chip systems is often expensive or impossible. Temperature compensation in sensors, for example, may require complex laser trim operations performed before device packaging. Alternatively, a companion IC can be programmed to provide compensation of the output signal, but this requires that the companion IC be trained and programmed once the system is assembled. In many cases, critical parameters cannot be measured after packaging, in which cases performance tuning is impossible or incomplete.

Hence, a need exists for systems, methods, and devices that enable performance tuning in multi-chip electronic systems. Moreover, a need exists for systems that enable more efficient use of devices having wide ranges of performance characteristics. Further, systems and methods for automatically performance tuning multi-chip systems are needed.

SUMMARY OF THE INVENTION

Briefly stated, the needs above are provided by a multi-chip system in which at least one of the chips includes a performance parameter encoded thereon. After system assembly, the performance parameter can be obtained by a companion chip and used to automatically or semi-automatically fine tune the companion chip to the specific parameters of the at least one chip.

In yet another embodiment, the invention contemplates a companion integrated circuit having an input/output mechanism for reading a device signature from an external device such as an analog circuit. The device signature is a value indicating at least one performance parameter of the external device. The companion integrated circuit further includes a mechanism for modifying its own behavior or performance based on the device signature it obtains after it is incorporated in a system.

In a method of practicing the present invention a first integrated circuit is fabricated and tested to obtain at least one parameter indicating a performance characteristic. A value corresponding to the parameter is stored on the first integrated circuit. The first integrated circuit is incorporated into a system comprising a second integrated circuit. The value is communicated from the first integrated circuit to the second integrated circuit. The second integrated circuit tunes its behavior in response to the exchanged value.

DETAILED DESCRIPTION OF THE PREFERRED EMBODIMENTS

The present invention is described herein in terms of multi-chip systems comprising an analog integrated circuit (IC) and a digital IC. It should be understood that more than two ICs may be use the features of the present invention. Similarly, practical systems often involve a variety of external devices and components coupled to the integrated circuits to perform application-specific functions. However, to ease understanding many of these implementation specific features are omitted from the drawings and description. Further, the present invention is readily applied to a variety of multi-chip systems where system performance or cost benefit from storing a parametric information describing a device to performance tune a system using the device.

Figure 1:
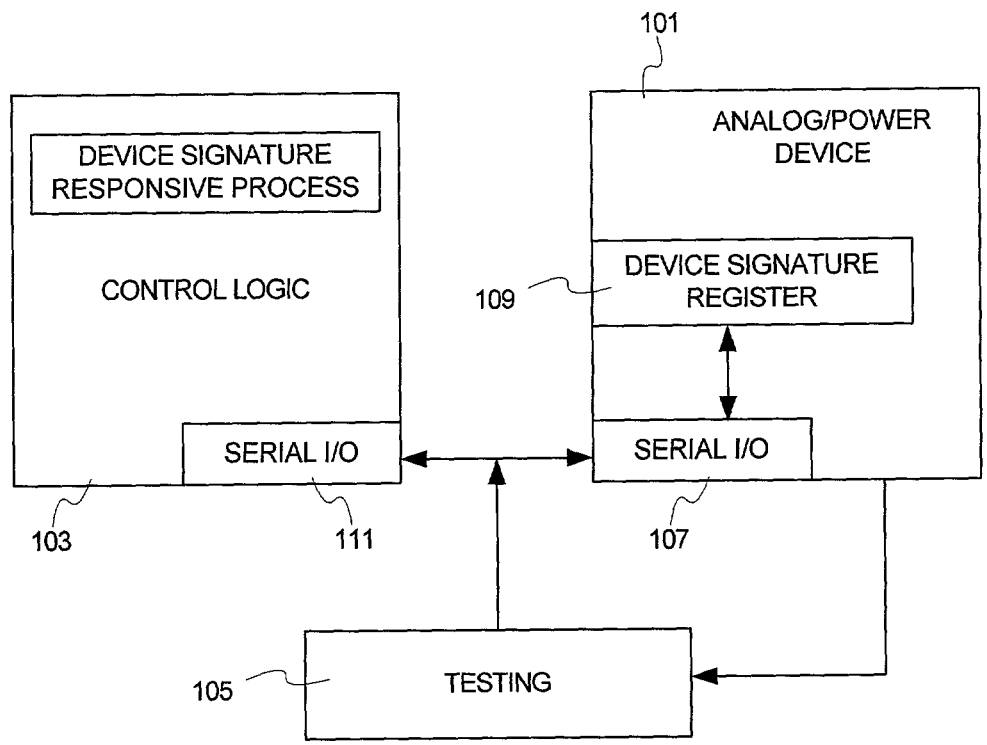
FIG. 1 shows an exemplary implementation of a multi-chip system in accordance with the present invention.

The system of FIG. 1 includes an analog or power device 101 that is coupled to a control logic device 103. Device 101 is formed as an independent integrated circuit from device 103. Devices 101 and 103 may be provided as separate packaged ICs mounted on a printed circuit board or similar system integration. Alternatively, devices 101 and 103 may be integrated in chip form in the form of a multi-chip module. As yet another alternative, devices 101 and 103 may be provided on separate physical circuit boards or subsystems and coupled together by a communication link such as a wire, bus, or network as might occur in a line driver/receiver subsystem.

FIG. 1 illustrates testing unit 105 which is not considered part of the system. Testing of electronic devices and systems occurs at multiple stages of manufacture including testing of partially processed wafers, wafer-level testing of chips, post-packaging test once chips are encapsulated, and system level test after the packaged devices are integrated into a system with other ICs. The present invention can be implemented using parametric information gathered at any one of these test operations, or using a combination of some or all of these test operations.

Testing typically involves a combination of functional testing, parametric testing, and stress testing. Functional testing determines whether the device performs one or more specified functions (e.g., does a switch turn on and off), and is predominant in logic devices. Parametric testing determines whether the device exhibits characteristics that fall within specified range of allowable characteristics (e.g., do turn on time, input capacitance, on-resistance and the like meet specifications). Stress testing determines whether the device satisfies various performance criteria such as providing suitable safe operating area, latch-up current, and the like.

In general, testing involves applying a voltage or current stimulus to some set of device electrodes and monitoring response signals on other device electrodes. Particularly in the case of integrated circuits, many device electrodes cannot be accessed after packaging, hence, testing that requires access to those electrodes cannot be performed at the system level. As a result, it has been, until now, impossible to use parametric information that required access to internal nodes of an IC to fine tune performance at the system level.

As a basic implementation, analog/power device 101 includes implementation-specific circuitry to such as amplifiers, power switches, and the like to drive current into a load such as a motor, flyback coil, antenna, fluorescent ballast circuit, magnetic read/write coil, or the like. An input/output (I/O) port such as serial I/O port 107 is provided for communicating with an external device (e.g., control logic device 103). Port 107 may be a serial or parallel communication port or both, and may comprise a multiple separate ports for coupling to various busses at the system level. Significantly, the present invention contemplates leveraging an existing port that would already be provided on device 101 for some other purpose even if the digital signature feature of the present invention were not used. For example, conventional motor driver circuits already include a two or three wire serial I/O interface for communicating with a control IC in operation. In this case, there would be no incremental cost in terms of chip size or complexity.

It is also possible to communicate with an external device by multiplexing the digital signature information onto one or more signal pins at a predetermined time such as power on so that an I/O port would not be required. Such an implementation might be appropriate, for example, if device 101 comprised a power transistor having only three leads and no explicit I/O port. For a short time after power is applied the gate lead could be used to communicate the device signature, then revert to normal gate signal functionality after the predetermined time. As yet another alternative, the device signature could be communicated over existing device leads using frequency domain, time domain, or other multiplexing techniques.

In accordance with the present invention, a small amount of memory preferably implemented using non-volatile techniques is used to implement device signature register 109. Device signature register 109 may comprise as few as two bits, or may comprise a tens or a few hundred bits. In an exemplary implementation it is expected that ten to fifty bits will allow ample storage space for device signature information.

Device signature register 109 is coupled to I/O interface 107. This enables device signature register 109 to be programmed and potentially reprogrammed using information gathered by test unit 105. The value(s) stored in signature register 109, which preferably indicate device-specific parametric values, reside within the device itself either permanently or until overwritten. In the case of signature information that can be overwritten (i.e., dynamic signature information), the signature register 109 can be activated for write operations at power up by some other convenient trigger such as entering a self test mode. One or more critical parameters may be measured by integrated self test mechanisms. In this manner, a device signature can be modified dynamically well after the testing phase, and can provide information that allows performance to be optimized in the event of parametric changes or drift over time, or changes induced by changes in operating environment.

The value stored in device signature register 109 is referred to as a device signature. The device signature value has a predefined format that is known to any device that later will access the device signature value, such as control logic device 103. The device signature value may be encoded or compressed. The device signature may indicate static or dynamic parameters as well as single valued parameters and dynamic parameters. For example, a single static value for on resistance may be included. Alternatively, parameters can be used to specify an equation or derating factor that in turn describes a dynamic parameter. For example, on resistance often changes as a function of current and a linear or quadratic equation could be developed to approximate this dynamic parameter. In another alternative, the encoded value could simply indicate a sort bin-type value. For example, the entire range of on resistances for a device could be subdivided into eight ranges, and the device signature could indicate (using only three bits), into which of the eight ranges that specific device fell.

In some cases it may be useful to include metadata such as devices signature version number or the like. A manufacture may wish to change the device signature format over time while providing for backwards compatibility with existing devices. A few bits of information indicating the version is readily employed by devices that use the device signature to interpret, decode, decrypt, or otherwise use the parametric information contained therein.

Control logic device 103 comprises, for example, an application specific integrated circuit (ASIC) having general-purpose, special-purpose, or programmable logic that performs control functions. In the motor control example, control logic 103 may include hardware, firmware, or software processes that compute when to turn a disk drive actuator motor on and off to position a read write head in response to read/write commands from an external computer. Control logic device 103 implements an I/O interface 111 that is compatible with the I/O interface of analog/power device 101.

In accordance with the present invention, control logic device 103 implements mechanisms and/or processes in hardware, firmware or software that obtain the device signature via I/O interfaces 111 and 107 from analog power device 101. Control logic device 103 also implements mechanisms and/or processes that respond to the device signature value to modify the behavior of the control logic. In this manner, control logic device 103 is able to automatically or semi-automatically fine-tune the system performance by modifying its behavior to more optimally interact with analog/power device 101.

By way of example, in a particular motor control application, when the system is first powered up the control IC 103 receives the device signature value. The device signature value may be transmitted only at initial power on, or may be retransmitted periodically or in response to a specific command from control logic 103. Assuming device 101 includes a power MOSFET having a specified maximum on resistance of 10 milliohm, but an actual on-resistance as indicated by the device signature of 8 milliohm. Without the knowledge provided by the device signature, the drive current supplied when device 101 is turned on will exceed what is intended by 20%, which will result in the motor moving farther than was intended by the control system. Using the device signature, control device 103 modifies its behavior to, for example, shorten the time that device 101 is activated so that the intended motor behavior is achieved. The increase in precision enabled by the use of a device signature may simplify or eliminate the need for some feedback systems used to compensate for variances in current system design.

Figure 2:
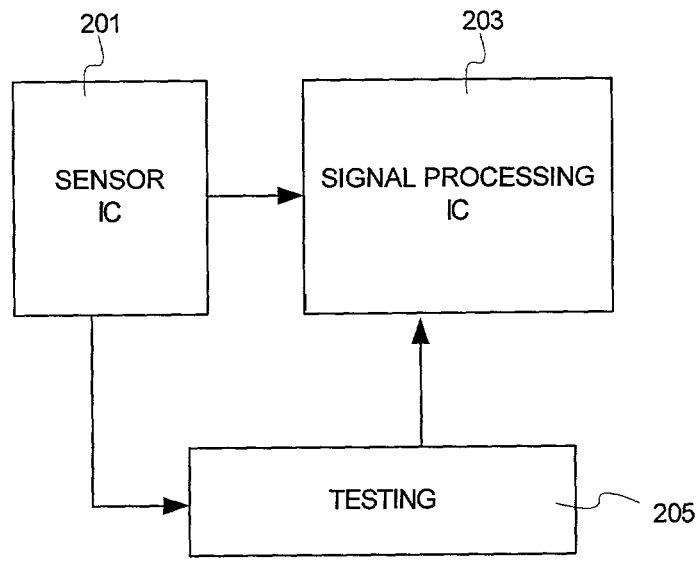
FIG. 2 shows another exemplary implementation of a multi-chip system in accordance with the present invention.

FIG. 2 illustrates an alternative embodiment involving a sensor or monitor IC 201 and a signal processing IC 203. The principals of the present invention remain substantially similar to that described in FIG. 1. Sensor IC 201 includes a device signature register and I/O mechanism coupled so that the device signature register can be programmed to store a device signature value from a test apparatus 205. After system assembly and power up, signal processing IC 203 obtains the device signature value, and modifies some hardware, firmware, or software defined behavior based on the device signature value. As a more specific example, when sensor IC 201 is a pressure sensor, the device signature may indicate the full-scale output voltage span of the particular sensor device 201. Gain mechanisms or algorithms in signal processing IC 203 can be adapted automatically to provide a normalized full-scale span that is device-independent.

Figure 3:
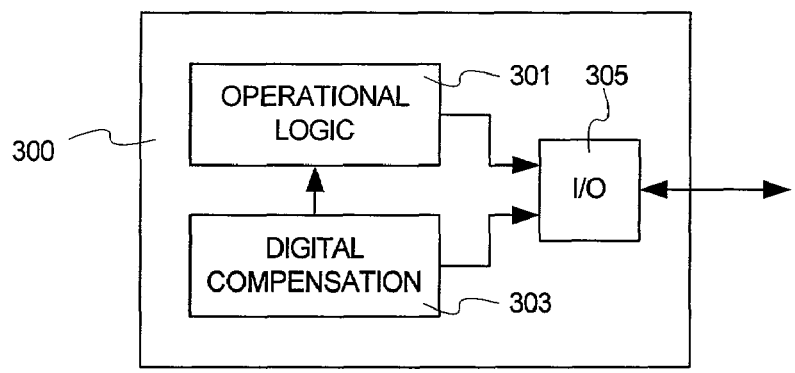
FIG. 3 illustrates in block-diagram form a digital logic integrated circuit using device signature information in accordance with the present invention.

FIG. 3 shows an exemplary control logic IC chip 300 in accordance with the present invention. Most of the chip area is dedicated to operational logic 301 configured to perform designed data manipulation tasks, including memory, gate arrays, and data processing devices such as controller cores, arithmetic units and the like. Digital compensation logic 303 describes generally the devices and/or firmware and software processes that customize the behavior of the operational logic based upon the device signature. It is often practical to store a copy of the device signature in the digital compensation logic, although it is not mandatory to do so. I/O interface 305 provides a communication mechanism for obtaining the device signature and preferably for exchanging operational control data with an external driver IC 400 (shown in FIG. 4), monitor IC 500 (shown in FIG. 5) or the like.

Figure 4:
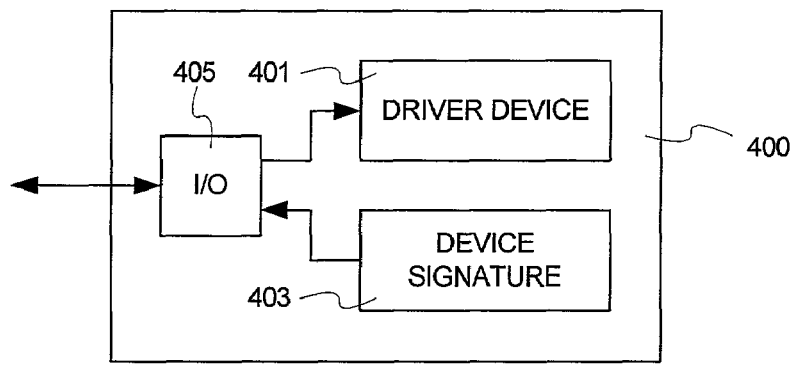
FIG. 4 illustrates in block-diagram form a driver integrated circuit implementing a device signature in accordance with the present invention.

The exemplary driver IC 400 shown in FIG. 4 is akin to device 103 shown in FIG. 1 in that it includes a power driver device 401, device signature register 403, and an I/O interface 405. Driver device 401 typically occupies most of the chip area and may include, for example, one or more power switch(es), amplification circuitry, internal compensation circuitry and the like. Although most logic and control circuitry is implemented by external devices such as logic chip 300, it is contemplated that some logic may also be incorporated in driver device 401. Device signature register 403 may be implemented using any available memory cell technology but preferably uses non-volatile random access memory (RAM) or read only memory (ROM) technology that is compatible with the technology used to manufacture device driver 401 and I/O interface 405. I/O interface 405 implements, for example, a two-wire or three-wire serial interface, and typically includes one or more registers for holding values used by driver device 401 in operation. One or more of these registers may be allocated for implementing device signature register 403.

Figure 5:
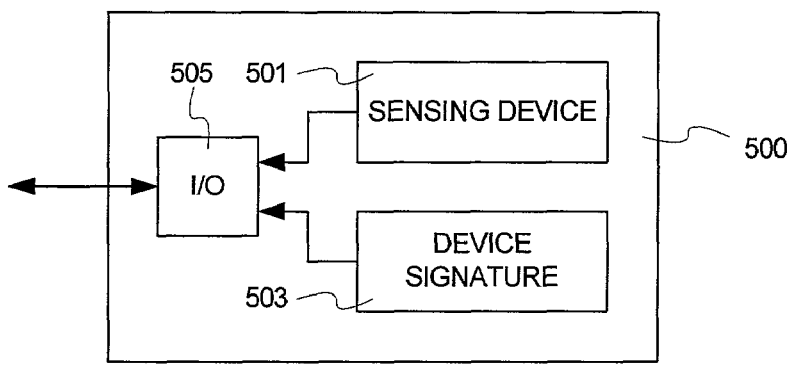
FIG. 5 illustrates in block-diagram form a sensor logic integrated circuit implementing a device signature in accordance with the present invention.

FIG. 5 illustrates the principles of the present invention implemented in a system having an analog or linear input device having a device signature file. The exemplary sensor or monitor chip or IC 500 shown in FIG. 5 includes a sensing device 501, device signature register 503, and an I/O interface 505. Sensing device 501 typically occupies most of the area of chip and may include, for example, pressure sensor, chemical sensor, electromagnetic field sensor, optical sensor, or a combination of more than one type of sensor. Device 501 may include analog amplification circuitry and the like. It is contemplated that some logic may also be incorporated in sensor device 500 501, however, the present invention is particularly useful in applications where it is impractical to implement all necessary system logic on chip 500. Device signature register 503 may be implemented using any available memory cell technology but preferably uses non-volatile random access memory (RAM) or read only memory (ROM) technology that is compatible with the technology used to manufacture sensor device 501 and I/O interface 505. I/O interface 505 is largely analogous to interface 405 in construction, function and operation.

Figure 6:
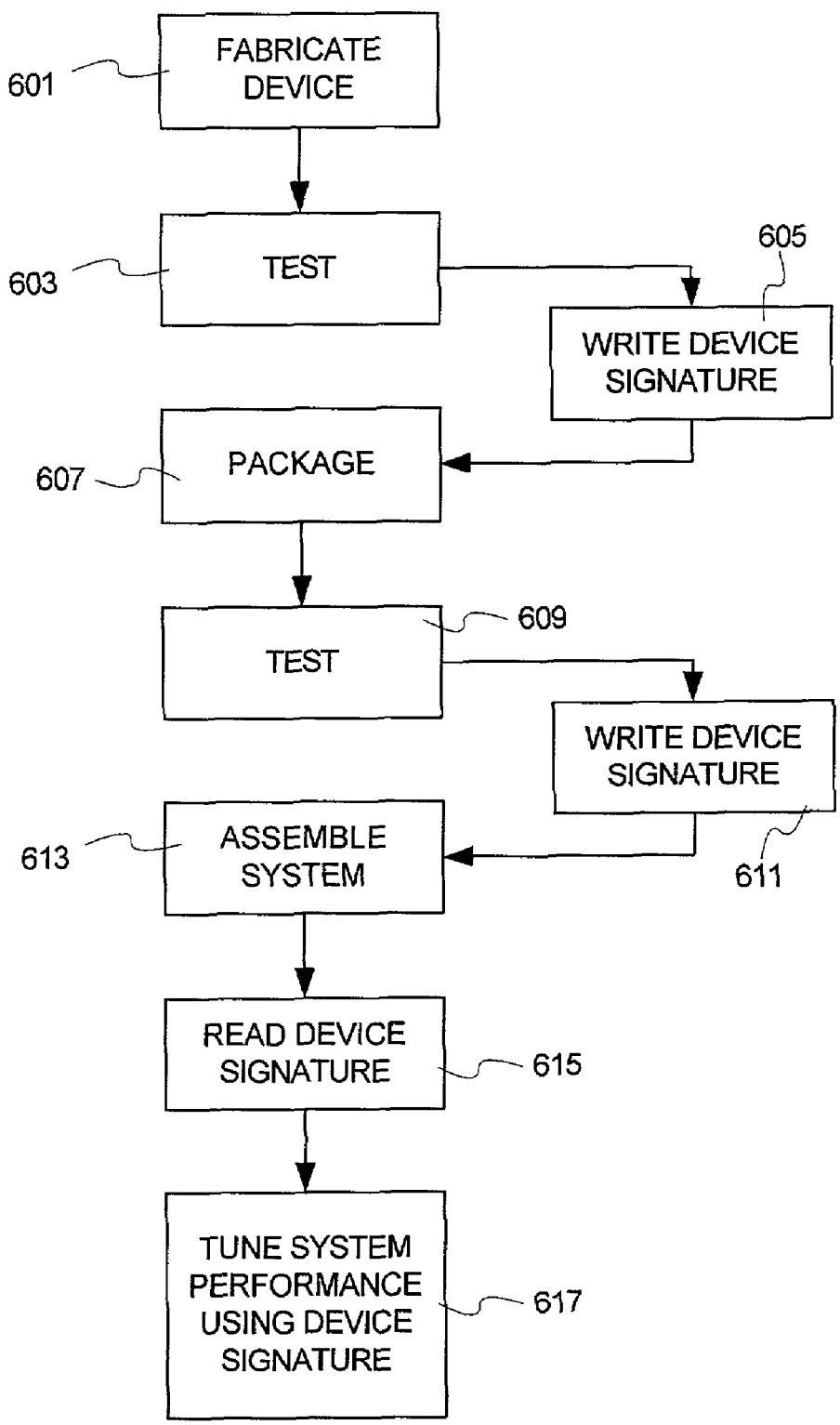
FIG. 6 illustrates a flow diagram of actions undertaken in accordance with a practice of the present invention.

FIG. 6 illustrates a flow diagram of various processes involved in a method of making and using a system in accordance with the present invention. Various operations and activities shown in the exemplary implementation of FIG. 6 may be omitted in particular applications. Likewise, it is contemplated that other processes, not shown, will be integrated with the processes shown in FIG. 6 to satisfy needs of particular applications. Unless specified to the contrary, the operations shown may be provided in alternative order while accomplishing the objectives set out herein.

In operation 601, a device is fabricated using available processing techniques to include a signature file memory in accordance with the present invention. Because of the wide variety of technologies that can be used to implement memory cells, a device design can be augmented with an adequate amount of memory in most cases without materially impacting the design or operation of the chip. In operation 603 the device fabricated in 601 is tested to determine one or more performance parameters, and in 605 the parameters are stored directly or in encoded form in the signature file memory. It should be understood that operations 603/605 performed at wafer-level or die-level are optional, and that in many cases it is not practical or possible to perform parametric testing or writing to a signature file memory before packaging. However, in cases where steps 603/605 are practical, the signature file information can be used in later processing testing, and device sorting, and so may offer some downstream cost advantages.

In operation 607, the device is appropriately packaged using substantially conventional packaging techniques. In general, operation 607 involves sawing wafers to separate devices, mounting the devices to a substrate or leadframe, and bonding wire or otherwise making electrical connections between the device and conductive leads that will extend from the packaged product. Operation 607 usually involves encapsulating the device in an appropriate manner with a polymer, metal can, or the like such that leads extend from the packaging.

The packaged devices are tested in operation 609, at which point parametric testing can be performed in most cases. Testing 609 may also include various sorting algorithms. In step 611, the parametric testing information is used to write to the device signature file as described above. To minimize pin count, it is preferred that some means of accessing the signature file through an existing lead is provided. This can be implemented using a variety of multiplexing mechanisms. In the preferred implementations, the device includes a serial port that is configured by a control signal on an existing lead to access the signature file memory. In this manner, a signature file can be written by the same machine that is performing the testing as such machines are generally programmable to assert desired signals on desired pins.

In 613, a multi-chip system is assembled using the product using appropriate assembly techniques such as printed circuit boards, multi-chip modules and the like. In operation 613, a device having a signature file is coupled to a logic device that is capable of reading the signature file in 615 and adapting some feature of the system behavior to the value stored in the signature file. In operation 615, it is preferred that the multiplexing mechanism used to write data to the device signature file is used to read data from the device signature file, although other equivalent access mechanisms are contemplated and may be appropriate in certain circumstances.

In operation 617, the system self tunes using the value stored in the device signature file. The tuning in operation 617 may account for multiple signature files in systems with multiple chips. In generally, tuning involves either using an algorithm to compute a compensation factor that accounts for the particular device performance indicated by the device signature or using the device signature to access a look-up table of stored compensation factors. For example, gain of an amplifier may be adjusted to affect input/output impedance matching or to match a driver more accurately to a driven load. In the past, such fine-tuning was performed manually, if at all. Even if manual tuning is used in conjunction with the present invention, the signature file will lessen or eliminate need for complex in-circuit parametric testing during the tuning process.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of making and using a multi-chip system comprising:
   fabricating a device to include a signature file memory;
   testing the device to determine one or more performance parameters;
   storing the parameters in the signature file memory;
   packaging the device;
   using parametric testing information of the packaged device to write to the device signature file;
   assembling a multi-chip system in which the device having a signature file is coupled to a logic device that is capable of reading the signature file and adapting some feature of the system behavior to the value stored in the signature file; and
   self-tuning the system using the value stored in the device signature file.

* * * * *